T. E. SANFORD & F. JACKSON.
FISHING FLOAT.
APPLICATION FILED JUNE 30, 1915.
1,243,881.
Patented Oct. 23, 1917.
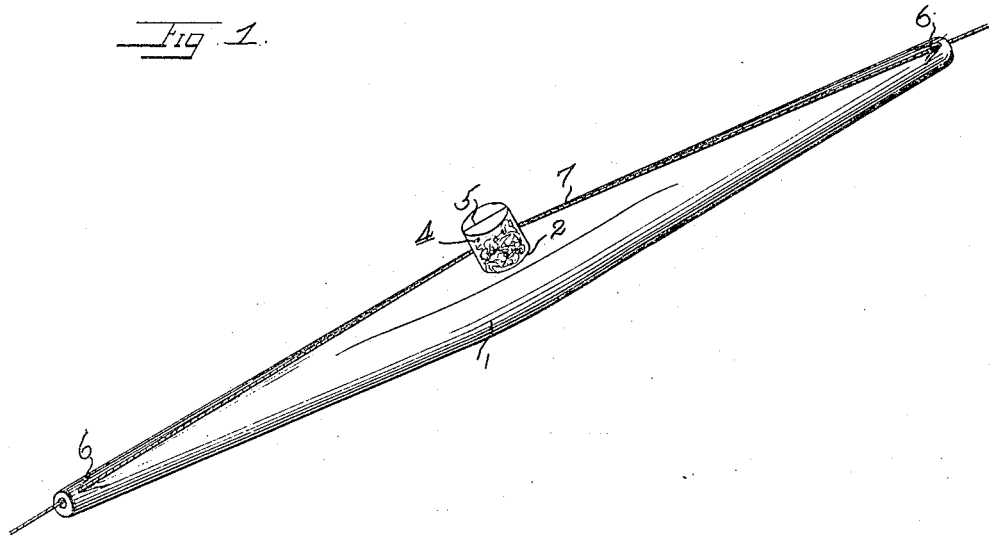
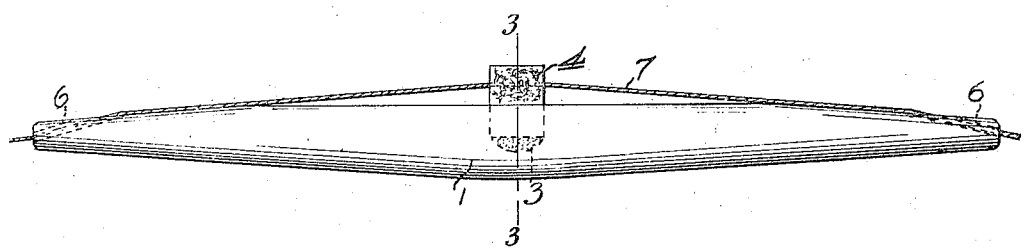
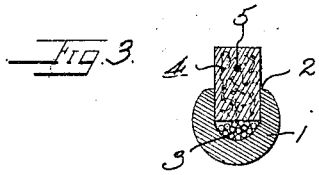
Inventors
Thurlow E. Sanford
and Fay Jackson,
By Geo. P. Kimmel.
Attorney

UNITED STATES PATENT OFFICE.

THURLOW E. SANFORD AND FAY JACKSON, OF MILAN, MICHIGAN.

FISHING-FLOAT.

1,243,881.   Specification of Letters Patent.   Patented Oct. 23, 1917.

Application filed June 30, 1915. Serial No. 37,311.

*To all whom it may concern:*

Be it known that we, THURLOW E. SANFORD and FAY JACKSON, citizens of the United States, residing at Milan, in the county of Washtenaw and State of Michigan, have invented certain new and useful Improvements in Fishing-Floats, of which the following is a specification.

This invention relates to improvements in fishing floats.

The object of our invention is to provide a fishing float of a design substantially that of a miniature submarine vessel, weighted so as to float in a horizontal position, whereby it is always plainly visible upon the water. Our float is provided with a line-tension which is not only easily adjusted upon the line, but which is so constructed that when the line is reeled to a point where the float contacts with the end of the rod, the fisherman may continue to reel his catch to a point very near the end of the rod.

Furthermore, our float is free from metal construction which is apt to rust and wear a line.

Other objects of this invention not at this time more particularly enumerated, will be clearly understood from the detailed description and drawings forming a part of this specification.

Furthermore, this invention consists in the novel arrangement and combination of parts more particularly described in the following specification and embodied in the claim appended hereunto and forming a part of this application.

Referring now to the drawings, which are merely illustrative of our invention,

Figure 1 is a perspective of our float.

Fig. 2 is a side elevation of the same showing the cork, weight, and guide eyes in dotted lines.

Fig. 3 is a cross sectional view taken on the line 3—3 of Fig. 2.

Referring further to the drawings, wherein similar reference characters designate similar parts throughout the respective views, 1 designates an elongated body portion having reduced ends, and formed preferably of wood. A recess 2 is formed centrally upon the top side of said body portion, said recess being adapted to receive a weight 3 in the bottom thereof, which is near the bottom side of said body portion. A cork 4 is mounted within said recess so that one end thereof will project above the face of said body portion. Said cork is provided with a slit 5 through the projecting end thereof, said slit being coincident with the length of said body portion. A guide eye 6 is formed diagonally from the upper face of the float near both ends thereof to a point centrally of said ends, a fishing line 7 being threaded through said guide eyes and engaging with the slit 5 in said cork.

It is obvious from the construction as described that the cork line-tension will always assume a vertical position when the float is cast into the water, and that in appearance it will resemble the conning tower of a submarine vessel. By painting the body portion red and the cork line-tension white the visibility of the float will be greatly increased. The grip of the cork line-tension is sufficient to retain the float in a predetermined position with respect to the line, and at the same time permit it to slide easily thereon.

The utility, adaptability, and advantages of our improved form of fishing float being obvious, it is unnecessary to further enlarge upon the same herein.

Having now described and pointed out the new and useful features of our invention, we do not limit ourselves to the shape of certain parts where the shape is not essential, nor do we restrict ourselves to the exact details of construction shown and described, but mean and intend to claim all equivalents and variations thereof not departing in principle from our invention, and falling within the purview of the appended claim.

What we claim as our invention and desire to secure by Letters Patent is:

A fishing float comprising an elongated body portion having fishing line guiding means at the opposite ends thereof, said body having an annular centrally disposed recess in one side thereof intermediate its ends extending transversely past the longitudinal axis of the body, ballast within said recess offset relative to the longitudinal axis of the body to normally position the float horizontally, a cork plug insertible in said recess to hold the ballast in position, a portion of said plug projecting from the recess, and said projecting portion of the plug being slit coincident with the length of the body to receive the fishing line and to additionally secure the plug in position.

In testimony whereof we affix our signatures hereto.

THURLOW E. SANFORD.
FAY JACKSON.